(12) United States Patent
Endo et al.

(10) Patent No.: US 6,724,690 B1
(45) Date of Patent: Apr. 20, 2004

(54) WRIST WATCH CONTAINING TAG

(75) Inventors: Takanori Endo, Saitama (JP); Takashi Tsuchida, Okegawa (JP); Seirou Yahata, Funabashi (JP)

(73) Assignees: Mitsubishi Materials Corporation, Tokyo (JP); Seiko Epson Corporation, Tokyo (JP)

( * ) Notice: Subject to any disclaimer, the term of this patent is extended or adjusted under 35 U.S.C. 154(b) by 0 days.

(21) Appl. No.: 10/292,507

(22) Filed: Nov. 13, 2002

(51) Int. Cl.⁷ .......................... G04B 47/00; G04B 37/00
(52) U.S. Cl. .................... 368/10; 368/278; 368/279; 368/280
(58) Field of Search ................... 368/10, 276, 277, 368/278, 279, 280, 281, 47; 342/51

(56) References Cited

U.S. PATENT DOCUMENTS

| | | | |
|---|---|---|---|
| 5,414,427 A | 5/1995 | Gunnarsson | |
| 6,278,873 B1 * | 8/2001 | Itakura et al. | 455/351 |
| 6,484,947 B1 * | 11/2002 | Miyata | 235/492 |
| 2002/0071346 A1 | 6/2002 | Paratte et al. | |

FOREIGN PATENT DOCUMENTS

| | | | |
|---|---|---|---|
| CH | 686 696 | 6/1996 | |
| CH | 691 094 | 4/2001 | |
| EP | 0 884 662 | 12/1996 | |
| EP | 0 766 152 | 4/1997 | |
| EP | 1 213 629 | 6/2002 | |
| JP | 2000137873 A | * 5/2000 | G08B/13/24 |
| JP | 2000172815 A | * 6/2000 | G06K/19/077 |
| JP | 2001006007 A | * 1/2001 | G07B/15/00 |
| JP | 2001216488 A | * 8/2001 | G06K/19/077 |
| JP | 2002-250783 | 9/2002 | |
| WO | WO 94/15316 | 7/1994 | |
| WO | WO 01/50423 | 7/2001 | |

* cited by examiner

*Primary Examiner*—David Martin
*Assistant Examiner*—Jeanne-Marguerite Goodwin
(74) *Attorney, Agent, or Firm*—Oblon, Spivak, McClelland, Maier & Neustadt, P.C.

(57) ABSTRACT

It is an object of this invention to provide a wrist watch containing an RFID tag which maintains a sense of luxury and has comparatively high sensitivity. The wrist watch containing tag of this invention comprises a watch case having a ring-shaped frame, a glass lid, and a bottom lid; a drive section which is accommodated inside the watch case; a display section for displaying time which is driven by the drive section; and an RFID tag which is accommodated inside the watch case and comprises an antenna and an IC chip; the ring-shaped frame and/or the bottom lid having at least one slit therein, and the antenna comprising a wound coil which runs along the inner face of the ring-shaped frame so as to surround the drive section. The slit is filled with a nonconductive resin, affixing the opposing cutaway planes together.

17 Claims, 11 Drawing Sheets

WRIST WATCH CONTAINING TAG

BACKGROUND OF THE INVENTION

1. Field of the Invention

The present invention relates to a wrist watch containing tag which uses radio frequency identification.

2. Description of the Related Art

Conventionally, plates such as ID charts and name cards are used in visually identifying persons and objects, but only a very limited amount of information can be displayed on such plates. For this reason, a tag has recently been developed which has an identification function electronically appended thereto by using RFID (radio frequency identification). The tag for identification comprises an IC chip and an antenna, electrically connected to the IC chip, and is attached on the plate, enabling information printed on the surface of the plate to be identified by sight, and making it possible to store a wide variety of information on the plate. For example, incoming/outgoing persons and objects can be controlled by attaching the tagged plates to them, and automatically reading the information stored in the IC chips.

Recently, this type of tag for identification is used as an identification device at entrance gates of ski lifts and rides in amusement parks, and as a ticket or commuter pass for trains and buses. By using this type of tag for identification in entrance gates and transportation systems, passengers attempting to board a ski lift, an amusement park ride, and a bus or train, can identify themselves as legitimate passengers by a simple operation of holding their tags near to an identification unit, provided at the gate.

The passengers who board the lifts, rides, buses, and the like, are usually wearing wrist watches. For this reason, there have been attempts to install tags for identification in the wrist watches. If this could be achieved, there would be no need to carry the tag for identification separately from the wrist watch, and the tag for identification could be fitted to a passenger's wrist without any sense of discomfort, potentially increasing its conventional field of use.

FIG. 19 shows a conventional wrist watch having a watch case 2, comprising a ring-shaped frame 2a, a glass lid 2b which seals the top side of the ring-shaped frame 2a, and a bottom lid 2c which seals the bottom side of the ring-shaped frame 2a, a drive section 3 which is accommodated inside the watch case 2, and a display section 4 which displays the time and is driven by the drive section, accommodated in the watch case 2. The display section 4 and the drive section 3 are provided in that order inside the ring-shaped frame 2a, the top side of which is sealed by the glass lid 2b, and lastly the bottom side of the ring-shaped frame 2a is sealed by the bottom lid 2c, to complete the structure of the wrist watch 1. Therefore, to provide a tag for identification in the conventional wrist watch 1, a coil is wound round the comparatively spacious area around the drive section 3 (i.e. along the inner face of the ring-shaped frame 2a) so as to surround the drive section 3, and this coil is used as an antenna for an RFID tag. The magnetic axis of the antenna comprising the coil is perpendicular to the watchface, which has the largest area, and consequently increases the sensitivity of the RFID tag when utilizing the wrist watch as an identification device, and lengthens its operational distance.

However, the ring-shaped frame of conventional wrist watches is made of an electrically conductive metal, in order to ensure durability and obtain a sense of luxury. As a result, when a coil is wound along the frame member so as to accommodate an antenna inside the wrist watch, an inductive current flows to the frame member when the antenna receives radio waves, canceling the electrical waves from the outside. In addition, when an electrical current has flowed along the coil forming the antenna, current may also flow into the metallic frame member, greatly deteriorating the sensitivity of the antenna and greatly shortening the operational distance of the RFID tag. One conceivable method of eliminating these problems is to use a frame member of nonconductive resin in the watch case of the wrist watch, but a frame member comprising resin does not produce any sense of luxury, and has poor durability. For the same reasons as the frame member, the bottom lid provided on the bottom side of the frame member is preferably made of metal, but a metal bottom lid fails to achieve sufficient antenna sensitivity.

SUMMARY OF THE INVENTION

It is a first object of this invention to provide a wrist watch containing tag which contains an RFID tag having high antenna sensitivity, and is durable and expresses a sense of luxury.

The wrist watch containing tag of this invention comprises a watch case having a ring-shaped frame, a glass lid which seals a top side of the ring-shaped frame, and a bottom lid which seals a bottom side of the ring-shaped frame; a drive section which is accommodated inside the watch case, a display section for displaying time which is accommodated inside the watch case and is driven by the drive section, and an RFID tag which is accommodated inside the watch case and comprises an antenna and an IC chip. The antenna comprises a wound coil which runs along the inner face of the ring-shaped frame so as to surround the drive section. At least one of the ring-shaped frame and the bottom lid comprises a metal material, and in addition, a slit for preventing the generation of inductive current is provided in at least one of the ring-shaped frame and the bottom lid which comprise the metal material.

This constitution is characterized in that the ring-shaped frame comprises a metal material, the bottom lid comprises an electrical insulating material, a slit is provided in at least one position of the ring-shaped frame by cutting across the ring-shaped frame, and the antenna has a coil which is wound along the inner face of the ring-shaped frame so as to surround the drive section.

When the wrist watch containing tag is worn on the wrist, the metal material of the ring-shaped frame around the glass lid expresses the original sense of luxury of the wrist watch. Since the bottom lid is comprised of an electrically insulated material, it does not obstruct the radio waves which are to be received by the antenna of the RFID tag accommodated inside the watch case.

Further, since the coil of the antenna is wound along the inner face of the ring-shaped frame so as to surround the drive section, the magnetic axis of the antenna becomes perpendicular to the watchface, increasing the sensitivity of the RFID tag and achieving a comparatively long operation distance. In this case, since the ring-shaped frame has at least one slit, no inductive current flows to the ring-shaped frame member, thereby ensuring that the sensitivity of the antenna does not deteriorate.

In the wrist watch containing tag of this invention, the slit is filled with a nonconductive resin, affixing together opposing cutaway planes which form the slit.

Since the opposing cutaway planes of the slit, which is cut across the ring-shaped frame, are affixed together, dust, water droplets, and such like, can be prevented from entering the slit, and the strength of the ring-shaped frame is prevented from deteriorating due to the provision of the slit. The watch case comprising the ring-shaped frame maintains its durability.

In the wrist watch containing tag of this invention, the opposing cutaway planes which form the slit comprise a plurality of continuous cutaway planes.

This increases the adhesive strength of the nonconductive resin, which is filled in the slit comprising the plurality of cutaway planes, and increases the strength of the ring-shaped frame.

Further, according to the wrist watch containing tag of this invention, an indent is provided in the top side and/or the bottom side of the ring-shaped frame, the slit is provided across the indent, and a clip member comprising the same material as the ring-shaped frame is affixed in the indent with the nonconductive resin therebetween.

Since the nonconductive resin is provided between the clip member and the indent, no inductive current flows to the frame member. By affixing a clip member of the same material as the ring-shaped frame into the indent, the clip member is able to cover the slit, concealing the slit from the outside and consequently improving the external appearance of the wrist watch.

Further, according to the wrist watch containing tag of this invention, the antenna comprises a magnetic core member along the inner face of the ring-shaped frame so as to surround the drive section, the coil being wound around the outer periphery of the magnetic core member.

In this wrist watch containing tag, the antenna comprises the magnetic core member, and therefore, the receiving sensitivity of the antenna can be increased.

Further, according to the wrist watch containing tag of this invention, the magnetic core member comprises a bobbin-like shape having a winding frame for coil, and is comprised of a compound material of magnetic powder or flakes and plastic.

The magnetic core member is formed by injection-molding or compression-molding of a compound material.

By forming the compound material in a bobbin-like shape, it becomes easier to wind the coil, and the magnetic core member can be obtained in any given shape, making it possible to achieve a comparatively inexpensive antenna.

Further, according to the wrist watch containing tag of this invention, the magnetic core member is formed by winding a magnetic painted film, made by applying and drying a paint or ink comprising powder or flakes of a magnetic material.

Therefore, a magnetic core member can be obtained which has a thickness of less than 0.8 mm, at which injection-molding becomes difficult. Moreover, even when the gap between the inner face of the ring-shaped frame and the outer face of the drive section is narrow, the RFID tag having the magnetic core member can be accommodated in the gap.

Furthermore, wrist watch containing tag according to this invention comprises a watch case having a ring-shaped frame, a glass lid which seals a top side of the ring-shaped frame, and a bottom lid which seals a bottom side of the ring-shaped frame; a drive section which is accommodated inside the watch case; a display section for displaying time which is accommodated inside the watch case and is driven by the drive section, and an RFID tag which is accommodated inside the watch case and comprises an antenna and an IC chip.

This constitution is characterized in that the antenna has a coil which is wound along the inner face of the ring-shaped frame so as to surround the drive section, the bottom lid comprises a metal main lid, or a nonmetal main lid and a metal supplementary lid, which is affixed so as to cover the nonmetal main lid; and one, two, or more, slits are provided in at least one end of the metal main lid and the metal supplementary lid, the slits extending to the outer edge thereof.

Since the metal main lid and the metal supplementary lid are comprised of a metal material, the original sense of luxury of the wrist watch can be expressed. In addition, since one, two, or more, slits extend to the outer edges of the metal main lid and the metal supplementary lid, a ring-shaped inductive current can be prevented from flowing around the metal main lid and the metal supplementary lid at the time of receiving waves, preventing the radio waves from being cancelled by the inductive current and preventing the sensitivity of the antenna from deteriorating.

Further, since the coil of the antenna is wound along the inner face of the ring-shaped frame so as to surround the drive section, the magnetic axis becomes perpendicular to the clock case, increasing the sensitivity of the RFID tag and achieving a comparatively long operating distance.

In the wrist watch containing tag of this invention, the slit(s) is/are filled with a nonconductive resin, affixing together the opposing cutaway planes which form the slit(s).

Therefore, dust, water droplets, and such like, can be prevented from entering the slit(s), and the strength of the ring-shaped frame is prevented from deteriorating due to the provision of the slit(s) For this reason, the watch case maintains its durability.

In the wrist watch containing tag of this invention, two or more slits radiate from the center of the metal main lid and the metal supplementary lid.

This enables the slits to be provided uniformly in the metal main lid and the metal supplementary lid, improving the external appearance.

Further, according to the wrist watch containing tag of this invention, the antenna comprises a magnetic core member, provided along the inner face of the ring-shaped frame so as to surround the drive section, and the coil is wound around the outer periphery of the magnetic core member.

Since the antenna comprises the magnetic core member, the receiving sensitivity of the antenna itself can be increased.

Further, according to the wrist watch containing tag of this invention, the magnetic core member comprises a bobbin-like shape, which has a winding frame for coil and is comprised of a compound material of magnetic powder or flakes and plastic.

The magnetic core member of this wrist watch containing tag is formed by injection-molding or compression-molding of a compound material.

The metal main lid and the metal supplementary lid can be made together in a single piece by injection-molding or compression-molding of the compound material By forming the compound material in a bobbin-like shape, it becomes easier to wind the coil, and the magnetic core member can be obtained in any given shape, making it possible to achieve a comparatively inexpensive antenna. Further, the magnetic core member and the metal supplementary lid can be made together in a single piece, simplifying the manufacturing process, and making it possible to obtain a comparatively inexpensive wrist watch containing tag.

According to the wrist watch containing tag of this invention, the magnetic core member is formed by winding a magnetic painted film, made by applying and drying a paint or ink comprising powder or flakes of a magnetic material, into a ring-shape.

Therefore, a magnetic core member can be obtained which has a thickness of less than 0.8 mm, at which injection-molding becomes difficult. Moreover, even when the gap between the inner face of the ring-shaped frame and the outer face of the drive section is narrow, the RFID tag having the magnetic core member can be accommodated in the gap.

DESCRIPTION OF THE PREFERRED EMBODIMENTS

Next, embodiments of the present invention will be explained with reference to the drawings.

Figure 1:
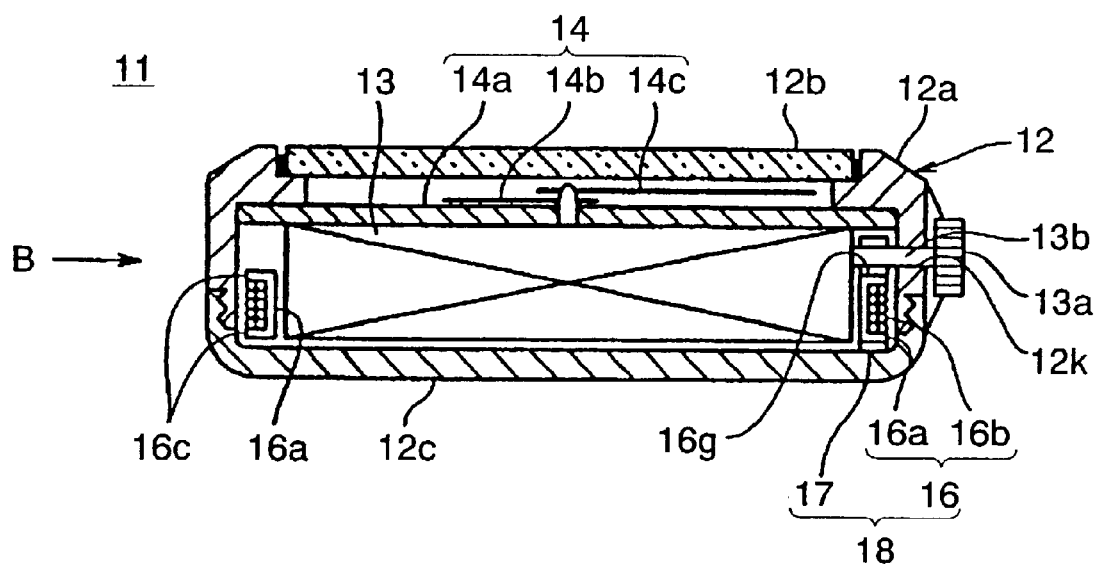
FIG. 1 is a cross-sectional view of a wrist watch containing tag according to a first embodiment of this invention, taken along the line A—A of FIG. 4.

As shown in FIGS. 1 to 4, a wrist watch 11 comprises a watch case 12, a drive section 13 (FIG. 1) which is accommodated inside the watch case 12, a display section 14 which displays the time and is driven by the drive section 13, and an RFID tag 18 (FIG. 1) which comprises an antenna 16 and an IC chip 17. As shown in FIG. 1, the case 12 comprises a ring-shaped frame 12a, a glass lid 12b, and a bottom lid 12c. The ring-shaped frame 12a is a circular ring of metal, the glass lid 12b is a circular plate of electrical insulating material (e.g. a glass plate), and the bottom lid 12c is a plate of electrical insulating material (e.g. plastic). The display section 14 comprises a watchface 14a, a short needle 14b, which is driven by the drive section 13 and rotates on the watchface 14a, a long needle 14c, and an unillustrated second needle; the drive section 13 rotates the short needle 14b, the long needle 14c, and the second needle on the watchface, thereby displaying the time. The drive section 13 is a rectangular parallelepiped, and is capable of changing the rotational positions of the short needle 14b and the long needle 14c in the display section 14 by the rotation of a knob 13a. The knob 13a connects via a supporting axis 13b to the drive section 13, and the supporting axis 13b passes through a supporting axis hole 12k, provided in the case 12, so as to rotationally support the knob 13a from outside the case 12.

The antenna 16 comprises a ring-shaped magnetic core member 16a, which runs along the inner face of the ring-shaped frame 12a so as to enclose the drive section 13, and a coil 16b, which is wound around the outside perimeter of the magnetic core member 16a and runs along the inner face of the ring-shaped frame 12a so as to enclose the drive section 13. The magnetic core member 16a preferably comprises a ring-shaped member of multilayered material, such as ferrite or amorphous foil, alternatively, it may comprise a ring-shaped member of a compound material comprising a magnetic metal, ferrite powder, or flakes, and plastic. A highly workable plastic with good thermoplasticity is used as the plastic in the compound material; a heat-resistant thermohardening plastic and the like can be used instead. The metal powder of the compound material comprises carbonyl iron powder, atomized powder such as iron parmalloy@, reduced iron powder, and the like. The metal flakes are made by microworking the powder by using a ball-mill, or the like, and mechanically compressing the powder, or by colliding molten granules of an iron-type or cobalt-type amorphous alloy with water-cooled copper.

Figure 3:
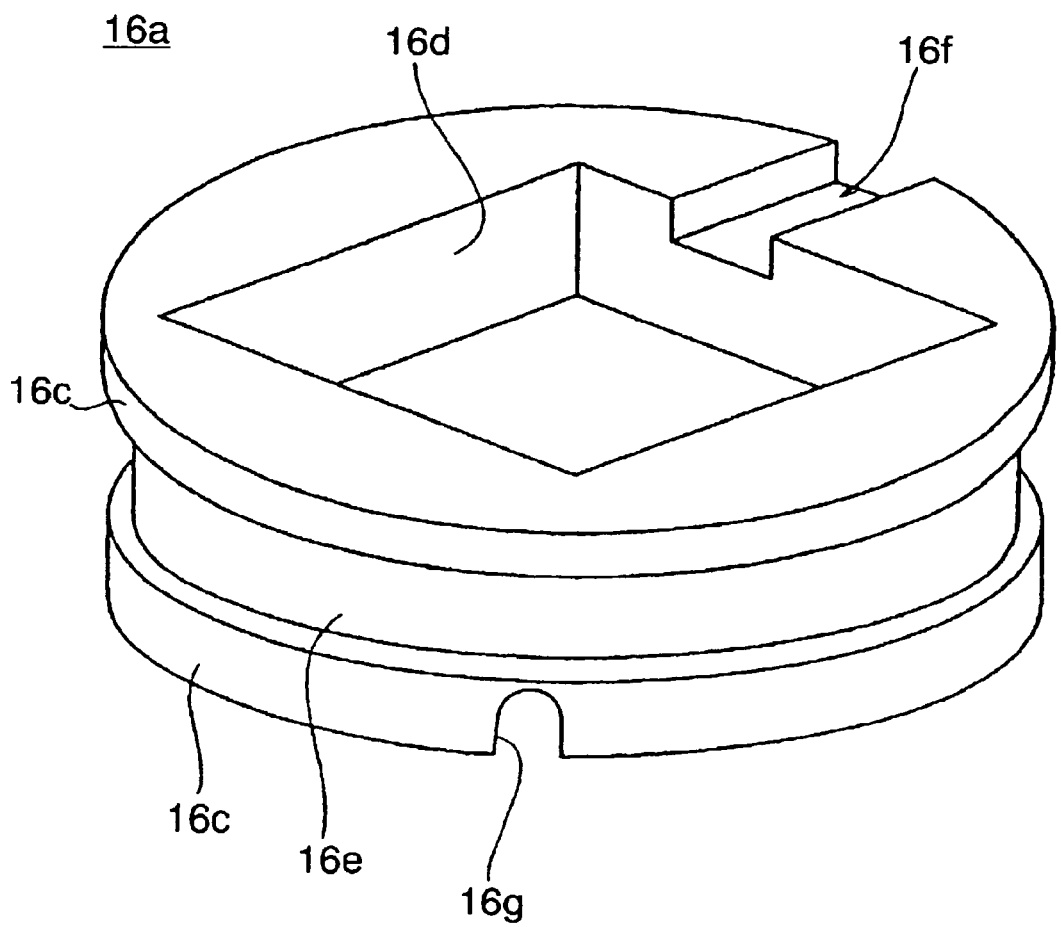
FIG. 3 is a perspective view of a magnetic core member which surrounds a drive section.

The magnetic core member 16a of this embodiment is manufactured by injection-molding or compression-molding of a compound material into a bobbin-like shape having a winding frame 16c for the coil 16b. As shown in FIG. 3, the bobbin-like magnetic core member 16a of this embodiment is disk-shaped and has a square hole 16d in its center; the square hole 16d is provided in correspondence with the external shape of the drive section 13 and allows the drive section 13 to be fitted therein. Winding frames 16c are provided around the top and bottom edges of the disk. An indented groove 16e is parallel to the perimeter of the disk, and runs between the winding frames 16c, provided along the top and bottom edges of the magnetic core member 16a; the coil 16b can be wound in this groove 16e. A notch 16f is provided in one face of the magnetic core member 16a, allowing an IC chip 17 to be fitted therein; a cavity 16f is provided in the other face of the magnetic core member 16a, allowing a supporting axis 13b for supporting the knob 13a to be inserted therein. Returning to FIG. 1, the coil 16b is wound around the perimeter of the magnetic core member 16a, so as to run along the inner face of the ring-shaped frame 12a and enclose the drive section 13, the axis line of the antenna 16 having the coil 16b being perpendicular to the watchface 14a. The IC chip 17 is provided in the cavity 16f of the magnetic core member 16a, and both ends of the coil 16b are electrically connected to the IC chip 17. Thus the antenna 16 and the IC chip 17 constitute an RFID tag 18, which is accommodated in the watch case 12 by inserting it from the bottom lid 12a side into the ring-shaped frame 12a, so that the supporting axis 13b fits into the cavity 16g of the magnetic core member 16a.

Figure 5:
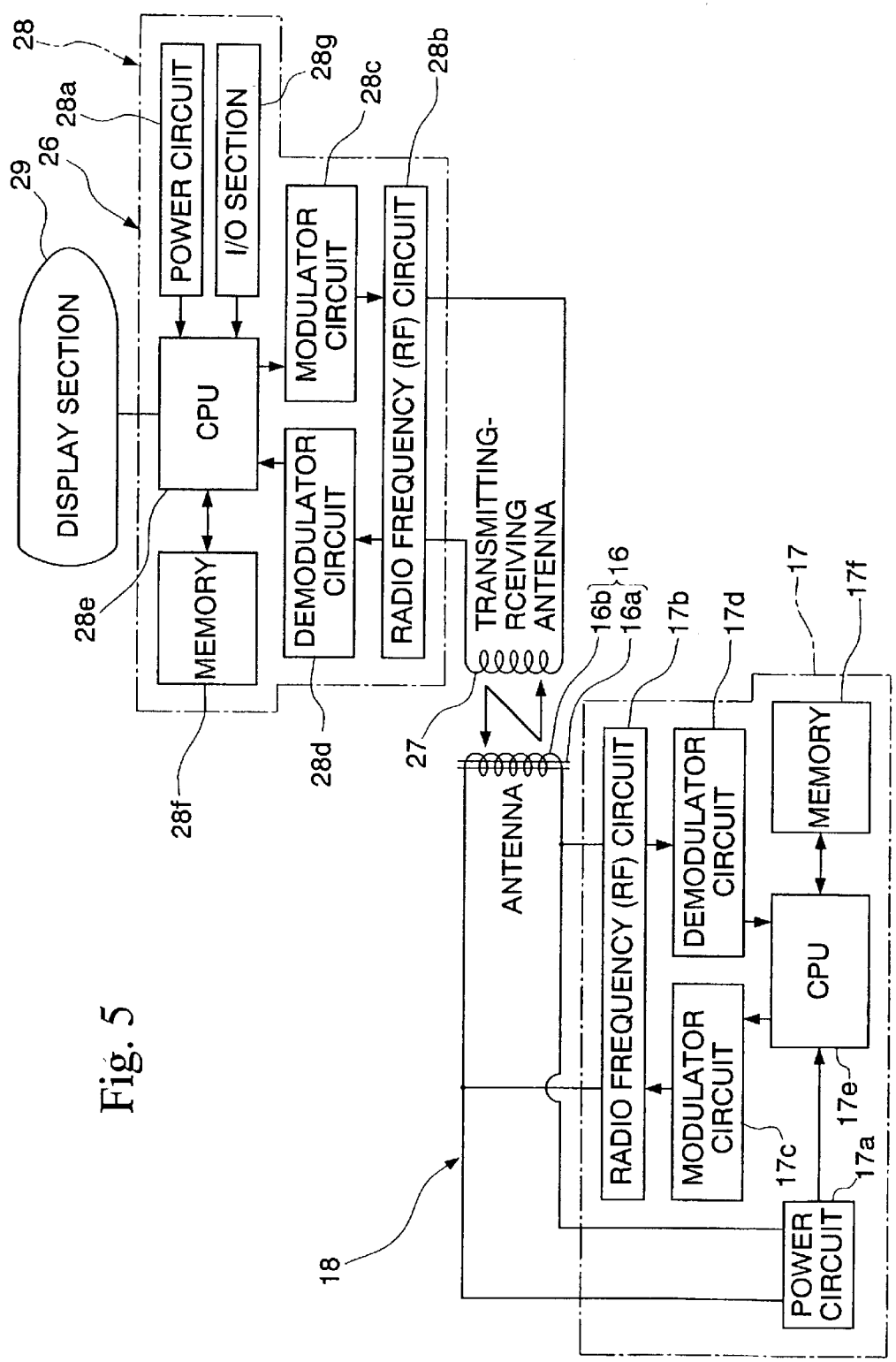
FIG. 5 is a block line diagram showing the relationship between an RFID tag and an identification unit.

As shown in FIG. 5, the IC chip 17 comprises a power circuit 17a, a radio frequency circuit 17b, a modulator circuit 17c, a demodulator circuit 17d, a CPU 17e, and a memory 17f which connects to the CPU 17e and stores information relating to the owner of the wrist watch. The power circuit 17a contains an unillustrated capacitor, which, together with the antenna 16, constitutes a resonance circuit. The capacitor is charged with electrical power generated by mutual induction when the antenna 16 has received radio waves at a specific frequency (the frequency which the resonance circuit resonates at). The power circuit 17a rectifies and stabilizes the power, and supplies it to the CPU 17e, activating the IC chip 17. The memory 17f comprises a ROM (read only memory), a RAM (random-access memory), and an EEPROM (electrically erasable programmable read only memory), data being read/written to and from the memory 17f in accordance with read/write commands sent by radio wave data transmission from an identifying unit 26 (explained later) in compliance with the CPU 17e.

Figure 2:
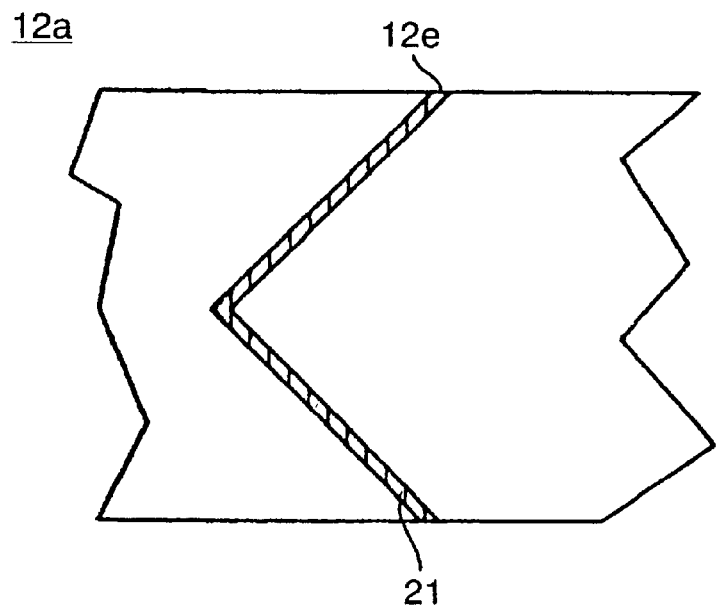
FIG. 2 is a side view of a ring-shaped frame from the direction B of FIG. 1.
Figure 4:
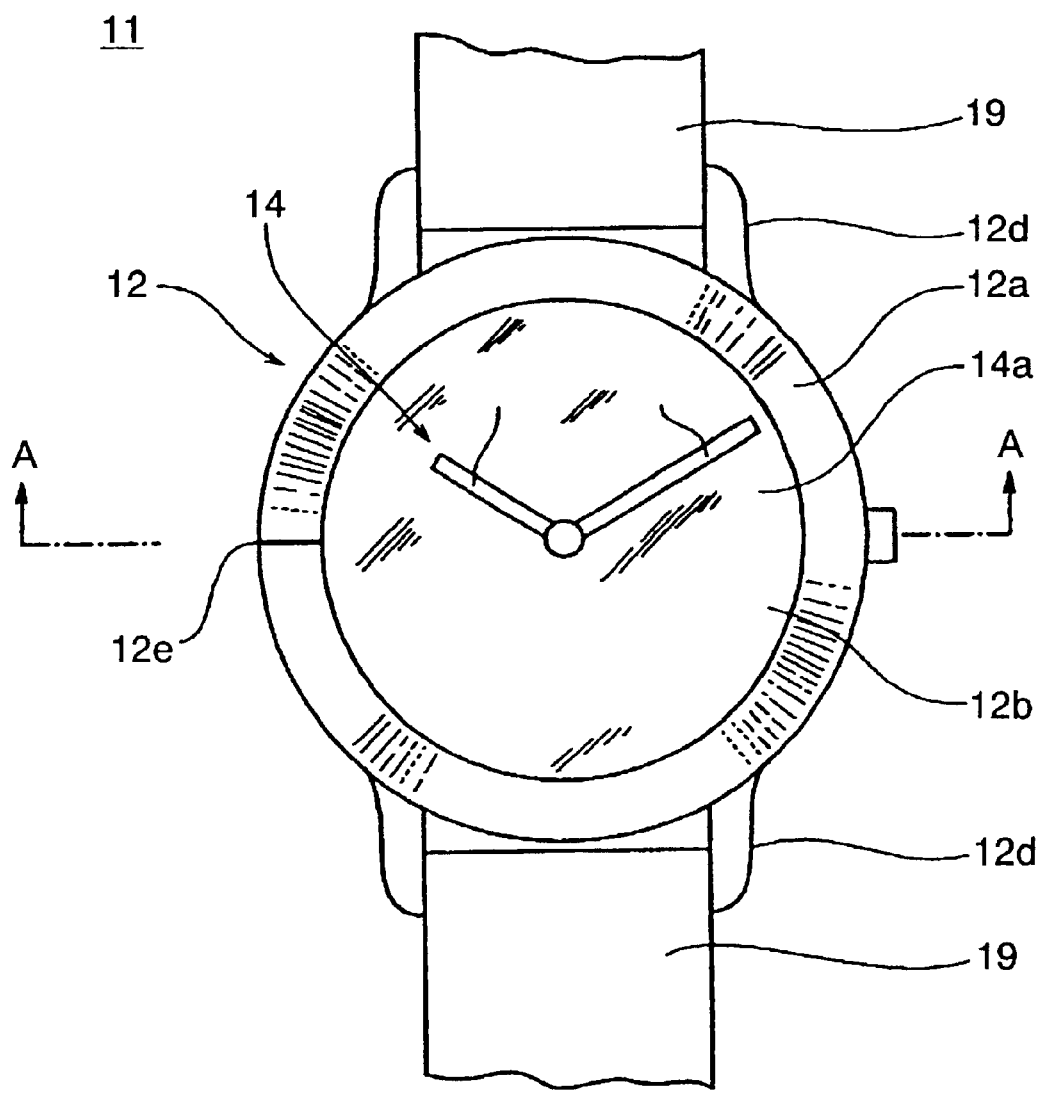
FIG. 4 is a plan view of a wrist watch.

As shown in FIG. 4, a slit 12e is provided in the ring-shaped frame 12a. The slit 12e is provided by cutting away at least one portion of the ring-shaped frame 12a; this embodiment illustrates a ring-shaped frame 12a having one slit. The slit 12e is formed by cutting away a section of the ring-shaped frame 12a by a method such as wire-cutting using a thin whetstone or radiation, cutting a wire with paint@granules, and the like; as shown in FIG. 2, the slit 12e of this embodiment is cut in such a way that two connected cutaway planes are formed on opposite sides of the slit 12e. The slit 12e is filled with a nonconductive resin 21, which affixes together the cutaway planes on opposite sides of the slit 12e. In FIG. 4, reference codes 12d and 12d represent pairs of supports protruding from the ring-shaped frame 12a, and both ends of a band 19 are attached to the supports 12d and 12d.

As shown in FIG. 5, an identifying unit 26 for reading the information stored in the IC chip 17 comprises a transmitting-receiving antenna 27 which is mutually inductive with the antenna 16, a processing section 28 which transmits radio waves from the transmitting-receiving antenna 27 and processes radio waves received by the transmitting-receiving antenna 27, and a display section 29 which displays information stored in the IC chip 17. The transmitting-receiving antenna 27 transmits and receives radio waves to/from the antenna 16 of the RFID tag 18, attached to the wrist watch 11. The processing section 28 is connected to the transmitting-receiving antenna 27, and comprises a power circuit 22a which contains a battery, a radio frequency (RF) circuit 22b, a modulator circuit 28c, a demodulator circuit 28d, a CPU 28e, and a memory 28f which connects to the CPU 28e and stores information read from the IC chip 17. An I/O section 28g is connected to the CPU 28e of the processing section 28, and information input to the I/O section 28g can be written to the IC chip 17.

A method for using the above wrist watch containing tag will be explained.

Before putting on the wrist watch 11, personal information relating to the person who will wear the wrist watch 11 is input from the input section 28g of the identifying unit 26 and stored in the memory 17f of the IC chip 17. This embodiment takes as an example information relating to train tickets, the contents of the information which is stored in the memory 17f specifically relating to first and last dates of a period during which the person is allowed to board the train, and train sections. After the information has been input, the wrist watch 11 is attached to the wrist of the owner by using the bands 19 and 19. In the wrist watch containing tag 11 of this invention, the ring-shaped frame 12a, which is visible around the glass lid 12b, comprises a metallic material, and therefore, when the wrist watch is worn on the wrist, the wrist watch 11 expresses a sense of luxury. Furthermore, in the wrist watch containing tag 11 of this invention, since the cutaway planes in the slit 12e in the ring-shaped frame 12a are affixed together by the nonconductive resin 21, the slit 12e does not cause the strength of the ring-shaped frame 12a to deteriorate, ensuring that the watch case 12 remains durable.

The identifying unit 26 is provided at the boarding gate of the train station, and, when a person who is wearing the wrist watch 11 passes through the gate, he holds the wrist watch 11 near to the transmitting-receiving antenna 27 of the identifying unit 26 at the gate. The identifying unit 26 transmits a query signal, comprising a binary digital signal, at a specific radio wave frequency from the transmitting-receiving antenna 27 toward the antenna 16 of the RFID tag 18. Since the bottom lid 12c of the wrist watch 11 is comprised of an electrically insulated material, it does not obstruct the radio waves which are to be received by the antenna 16 of the RFID tag 18 accommodated inside the watch case 12, and the waves transmitted from the transmitting-receiving antenna 27 pass through the glass lid 12b and the bottom lid 12c to the antenna 16. Since the coil 16b of the antenna 16 is wound along the inner face of the ring-shaped frame 12a so as to surround the drive section 13, the magnetic axis of the antenna 16 becomes perpendicular to the watchface 14c, increasing the sensitivity of the RFID tag 18 and achieving a comparatively long operation distance. Since the ring-shaped frame 12a has at least one slit 12e, no inductive current flows to the frame member 12a, and, since the antenna 16 of this embodiment comprises the magnetic core member 16a, the receiving sensitivity of the antenna 16 itself is increased, enabling it to effectively receive radio waves transmitted from the transmitting-receiving antenna 27.

When the antenna 16 of the RFID tag 18 receives the waves, electrical power is charged to the capacitor of the power circuit 17a. The power circuit 17a supplies the power to the CPU 17e, activating the IC chip 17, whereby the query signal comprising the original digital signal is reproduced at the demodulator circuit 17d via the radio frequency circuit 17b. Based on the query signal, the CPU 17e transmits information relating to the wrist watch 11, stored in the memory 17f. The information is transmitted by modulating a binary data signal in the modulator circuit 17c of the IC chip 17, amplifying it in the radio frequency circuit 17b, and transmitting it from the antenna 16. The transmitting-receiving antenna 27 of the identifying unit 26 receives the transmitted data, the processing section 28 displays the information relating to the person wearing the wrist watch according to the RFID tag 18, and the door at the gate opens, allowing the person wearing the wrist watch 11 to board the train.

Figure 6:
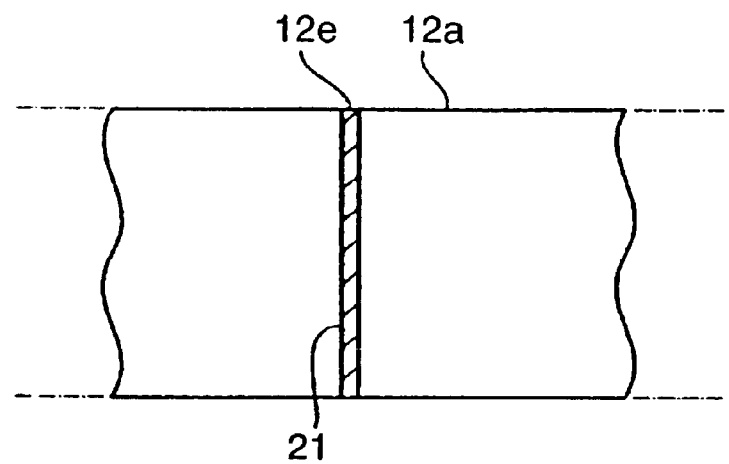
FIG. 6 is a side view of a slit wherein opposing cutaway planes form a single face.
Figure 7:
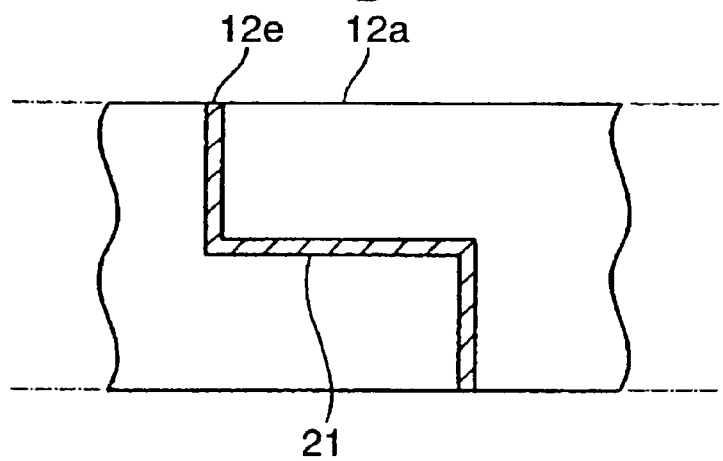
FIG. 7 is a side view of a modified slit wherein the opposing cutaway planes form three cutaway planes.

Incidentally, the above embodiment describes a slit comprising two continuous cutaway planes, but the opposing cutaway planes of the slit 12e may form a single plane as shown in FIG. 6, or three cutaway planes as shown in FIG. 7. Although not illustrated in the diagrams, the slit may comprise a plurality of four, five, six, or more, continuous cutaway planes.

In the embodiment described above, one slit is provided in the ring-shaped frame 12a, but slits may be provided in two or more positions. However, when two or more slits 12e are provided, the ring-shaped frame 12a itself consequently comprises a plurality of members, and it becomes necessary to increase the mechanical strength of the ring-shaped frame 12a; for these reasons, the opposing cutaway planes of the slits 12c should preferably comprise a plurality of continuous cutaway planes, increasing the adhesive strength of the nonconductive resin 21, which is filled into the slits 12e, between the plurality of members.

Figure 8:
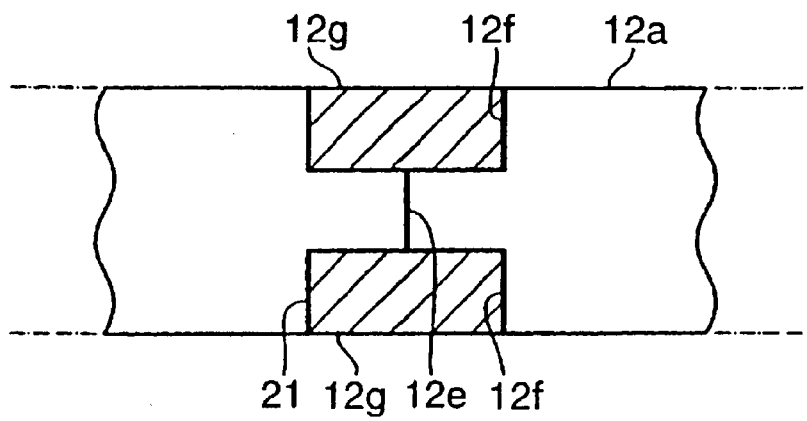
FIG. 8 is a side view corresponding to FIG. 2, where clip members have been affixed into indents in the ring-shaped member.

Furthermore, although the above embodiment describes the ring-shaped frame 12a having a slit therein, it is acceptable, as shown in FIG. 8, to provide indents 12f and 12f in the top and bottom sides of the ring-shaped frame 12a, cut a slit 12e between the indents 12f and 12f, and affix clip members 12g and 12g, which comprise the same material as the ring-shaped frame 12a, into the indents 12f and 12f with the nonconductive resin 21 therebetween. When the clip members 12g and 12g are affixed in this manner, the nonconductive resin 21, which is provided between the clip members 12g and 12g and the indents 12f and 12f, prevents the inductive current from flowing into the ring-shaped frame 12a. On the other hand, the slit 12e can be covered with the clip members 12g and 12g by affixing clip members comprised of the same material as the ring-shaped frame 12a to the indents 12f and 12f, making the slits 12e invisible from the outside and thereby improving the external appearance of the wrist watch 11.

Further, the above embodiment describes the magnetic core member 16a which is manufactured by injection-molding or compression-molding of a compound material; however, when there is a comparatively small gap between the inner face of the ring-shaped frame 12a and the outer face of the drive section 13, the magnetic core member 16a may be made by winding a magnetic painted film into a ring-shape. The magnetic painted film is provided by pasting and drying a magnetic paint, or an ink of magnetic powder or flakes, on an electrical insulating film; the magnetic painted film can be wound together with the electrically insulated film used at the time of painting, or alternatively, the magnetic painted film is peeled off from the electrical insulating film and wound by itself The same material as the compound material mentioned above can be used as the flakes and powder of the magnetic material contained in the paint and ink. The thickness of the magnetic painted film should be between 10 and 800 µm, and preferably between 30 and 300 µm. When the desired thickness cannot be achieved by a single application of paint, the paint can be repeatedly applied and dried until the desired thickness is achieved, and the thickness of the wound section of the magnetic painted film can be adjusted by increasing or decreasing the number of winds. The magnetic core member obtained by winding the magnetic painted film is extremely thin, making it possible to obtain a magnetic core member having a thickness of less than 0.8 mm, at which molding becomes difficult. Therefore, even when there is only a small gap between the inner face of the ring-shaped frame 12a and the outer peripheral face of the drive section 13, it is possible to accommodate an RFID tag having a magnetic core member in the gap.

Subsequently, a test of this invention will be explained in detail, together with a comparative example.

COMPARATIVE EXAMPLE

A wrist watch case 12 having a ring-shaped frame 12a comprised of stainless steel and having an inner diameter of 28 mm, a glass lid 12b which seals the top side of the ring-shaped frame 12a, and a bottom lid 12c which seals the bottom side of the ring-shaped frame 12a and is comprised of polycarbonate resin, was prepared. An antenna comprising a coil was made by winding a copper-coated wire having a thickness of 0.3 mm four times, so that its diameter became 20 mm. The antenna was accommodated inside the watch case to obtain a wrist watch containing tag. This wrist watch is the first comparative example.

Test 1

The watch case 12 and antenna comprising coil were prepared in exactly the same way as in the comparative example. One section of the ring-shaped frame of the watch case was cut to a width of 0.07 mm to form a slit in the ring-shaped frame, and the antenna was accommodated in the watch case to obtain the watch containing tag. The wrist watch using the ring-shaped frame having a slit therein is the first test.

Test 2

The watch case 12 and antenna comprising coil were prepared in exactly the same way as in the comparative example. A paint containing flakes of a magnetic material was applied and dried over one main face of an electrical insulating film having a thickness of 50 µm, obtaining a magnetic painted film having a thickness of 130 µm. The electrical insulating film having the magnetic painted film on one main side thereof was cut, together with the magnetic painted film, to a width of 3 mm and a length of 170, and the cut electrical insulating film and magnetic painted film were wound until the diameter became 20 mm, obtaining a magnetic core member comprising a magnetic painted film. An antenna comprising a coil was made by winding a copper-coated wire having a thickness of 0.3 mm four times around the outer face of the magnetic core member. The antenna was accommodated inside the watch case 12 having a slitted ring-shaped frame, thereby obtaining a wrist watch containing tag. This wrist watch having a slitted ring-shaped frame and a magnetic core member is the second test.

Comparative Test

A measuring terminal of a gauge (Hewlett Packard 4395) for measuring the coil characteristics was connected to each of the antenna coils of the first comparative example and the first and second tests, and the L values and Q values of the antenna at predetermined frequencies were measured by using the gauge.

An IC chip was connected to each of the antenna coils of the first comparative example and the first and second tests, and made to function as an RFID tag operating at 13.56 MHz; thereafter, the tag was accommodated inside a battery case. The wrist watch containing tag was moved near to a transmitting-receiving antenna of an identifying unit operating at 13.56 MHz, it was confirmed whether the identifying unit was operating, and, when it operated, the distance between the transmitting-receiving antenna and the wrist watch containing tag at the first operation was measured. Table 1 shows the results obtained.

TABLE 1

|  | Test 1 | Test 2 | Comparative example |
|---|---|---|---|
| Number of coil | 5 | 4 | 5 |

TABLE 1-continued

|  | Test 1 | | Test 2 | | Comparative example | |
| --- | --- | --- | --- | --- | --- | --- |
| windings |  |  |  |  |  |  |
| Magnetic core member | No | | Yes | | No | |
| Slit | Yes | | Yes | | No | |
| Predetermined | L | Q | L | Q | L | Q |
| frequency | ($\mu$H) | | ($\mu$H) | | ($\mu$H) | |
| 1 MHz | 1.222 | 12.9 | 1.061 | 14.3 | 0.998 | 12.3 |
| 5 MHz | 1.171 | 27.7 | 1.028 | 29.7 | 0.957 | 26.4 |
| 10 MHz | 1.177 | 37.7 | 1.047 | 38.0 | 0.962 | 36.5 |
| 11 MHz | 1.191 | 41.3 | 1.053 | 39.3 | 0.966 | 38.1 |
| 12 MHz | 1.204 | 42.4 | 1.062 | 39.4 | 0.970 | 39.5 |
| 13.56 MHz | 1.213 | 41.6 | 1.078 | 39.7 | 0.979 | 41.0 |
| 15 MHz | 1.201 | 44.0 | 1.092 | 38.7 | 0.987 | 42.0 |
| 20 MHz | 1.237 | 58.6 | 1.163 | 32.3 | 1.026 | 44.5 |
| Operation | Operation at 10 mm | | Operation at 20 mm | | No Operation | |

As is clear from Table 1, there is no noticeable difference in the Q values of the first and second tests and the first comparative example. However, the identifying unit did not operate when IC chip was connected to the coil of the antenna in the first comparative example, but did operate when IC chips were connected to the coils of the antennas in the first and second tests. It may be assumed that the identifying unit did not operate in the first comparative example because no slit was provided in the ring-shaped frame, and consequently an inductive current flows to the ring-shaped frame, reducing the sensitivity of the antenna. In contrast, the identifying unit operated in the first and second tests due to the provision of a slit in the ring-shaped frame, preventing any flow of inductive current and preserving the sensitivity of the antenna. The second test operated at twice the distance of the first test due to the provision of the magnetic core member.

As described above, according to this invention, since the ring-shaped frame around the glass lid of the watch case comprises a metal material, the original sense of luxury of the wrist watch can be expressed. In addition, since the bottom lid comprises an electrical insulating material, it does not obstruct radio waves which are to be received by the antenna accommodated in the watch case. Further, since the coil of the antenna is wound along the inner face of the ring-shaped frame so as to surround the drive section, the magnetic axis of the antenna is perpendicular to the watchface, increasing the sensitivity of the RFID tag and achieving a comparatively long operating distance. In this case, since the ring-shaped frame has at least one slit, no inductive current flows to the ring-shaped frame member and the sensitivity of the antenna is prevented from decreasing.

Further, since the opposing cutaway planes which form the slit are affixed together by filling the slit with a nonconductive resin, the slit does not reduce the strength of the ring-shaped member; when the opposing cutaway planes which form the slit are comprised of a plurality of continuous cutaway planes, the adhesive strength of the nonconductive resin, which is filled in the slit, increases, further increasing the strength of the ring-shaped member. In this case, by providing an indent in the top and/or bottom side of the ring-shaped member, providing the slit across the indents, and affixing clip members of the same material as the ring-shaped member into the indents by using nonconductive resin, inductive current can be prevented from flowing to the frame member and the slit can be covered by the clip members, thereby making the slits invisible from the outside and improving the external appearance of the wrist watch.

Further, since the ring-shaped magnetic core member of the antenna is provided along the inner face of the ring-shaped frame so as to surround the drive section, and the coil is wound around the outer periphery of the magnetic core member, the reception sensitivity of the antenna can be increased. In this case, when the magnetic core member comprises a compound material, it can be made into any given shape; by making the magnetic core member a bobbin-like shape, it is easier to wind the coil and the antenna can be obtained comparatively inexpensively. On the other hand, by making the magnetic core member by winding a magnetic painted film into a ring-shape, it becomes possible to obtain a magnetic core member having a thickness of less than 0.8 mm, at which molding becomes difficult, even when there is only a small gap between the inner face of the ring-shaped frame and the outer peripheral face of the drive section, the RFID tag having the magnetic core member can be accommodated in the gap.

Subsequently, a second embodiment of this invention will be explained based on the drawings.

Figure 9:
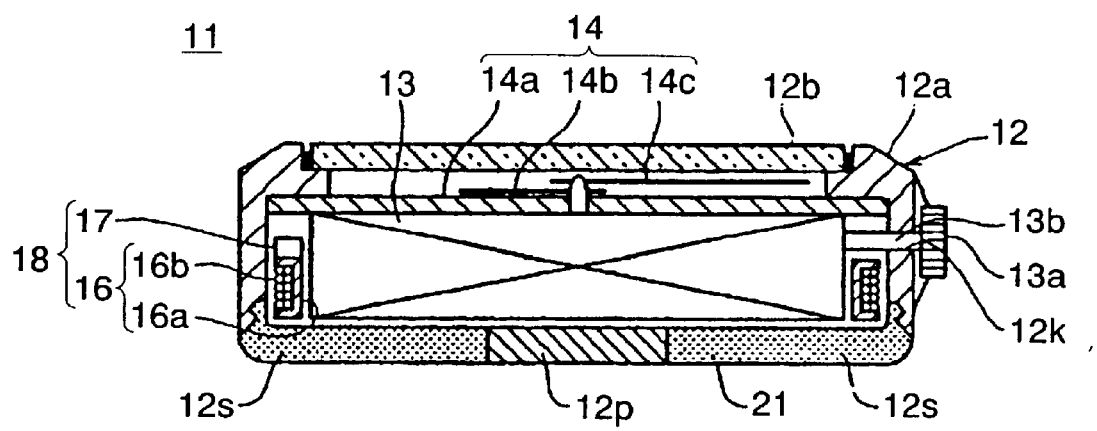
FIG. 9 is a cross-sectional view of a wrist watch containing tag according to a second embodiment of this invention, taken along the line C—C of FIG. 10.
Figure 11:
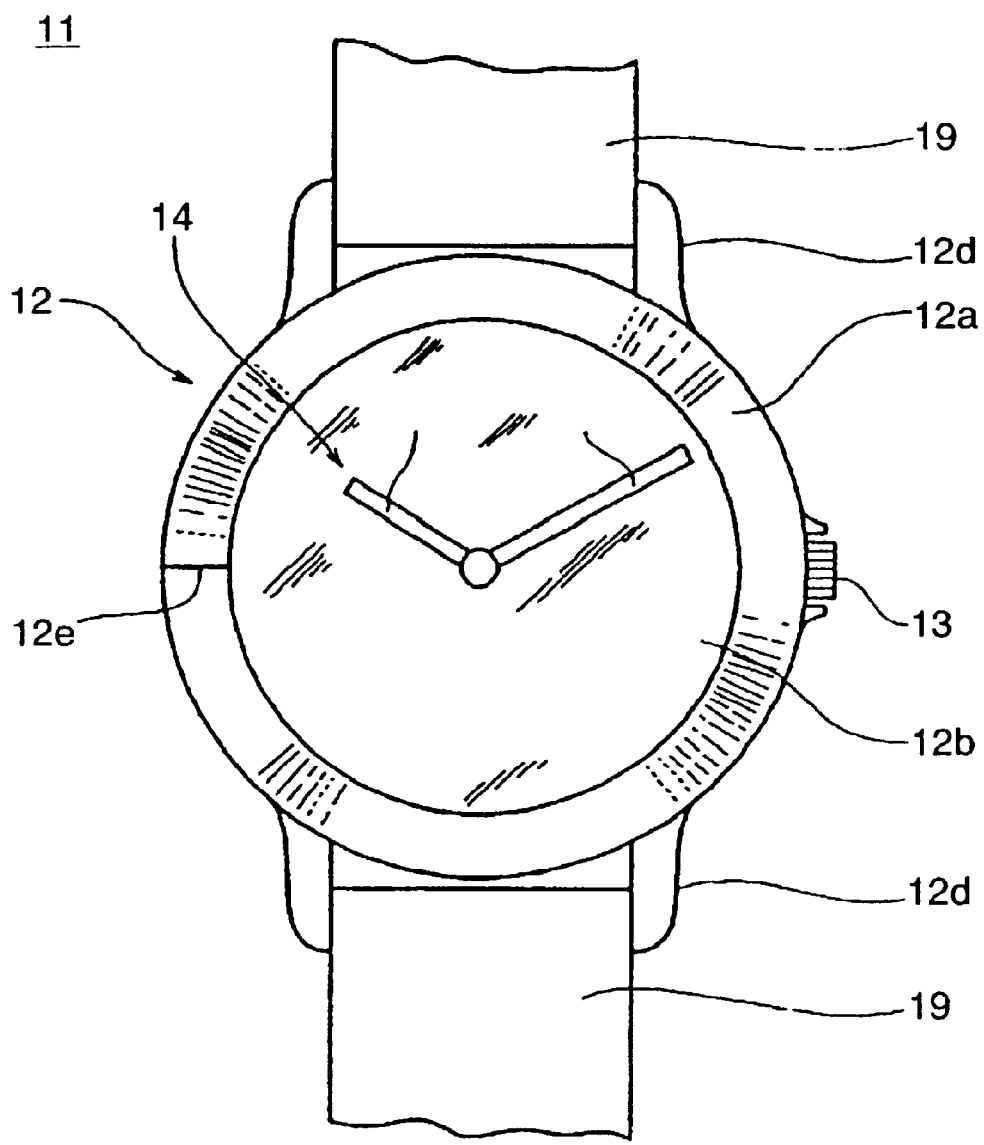
FIG. 11 is a top view of the wrist watch containing tag of FIG. 9.

As shown in FIGS. 9 and 11, a wrist watch 11 comprises a watch case 12, a drive section 13 (FIG. 9) which is accommodated inside the watch case 12, a display section 14 which displays the time and is driven by the drive section 13, and an RFID tag 18 (FIG. 9) which comprises an antenna 16 and an IC chip 17. As shown in FIG. 9, the case 12 comprises a ring-shaped frame 12a, a glass lid 12p, and a bottom lid 12p. The ring-shaped frame 12a is a circular ring of metal, and has a slit 12e which prevents the flow of ring-shaped inductive current around the ring-shaped frame 12a. The glass lid 12b comprises a disk of electrical insulating material (a glass plate). The display section 14 comprises a watchface 14a, a short needle 14b, which is driven by the drive section 13 and rotates on the watchface 14a, a long needle 14c, and an unillustrated second needle; the drive section 13 rotates the short needle 14b, the long needle 14c, and the second needle on the watchface, thereby displaying the time. The external shape of the drive section 13 is a rectangular parallelepiped, and the drive section 13 is capable of changing the rotational positions of the short needle 14b and the long needle 14c in the display section 14 by the rotation of a knob@ 13a. The knob 13a connects via a supporting axis 13b to the drive section 13, and the supporting axis 13b passes through a supporting axis hole 12k, provided in the case 12, so as to rotationally support the knob 13a from outside the case 12.

The antenna 16 comprises a ring-shaped magnetic core member 16a, which runs along the inner face of the ring-shaped frame 12a so as to enclose the drive section 13, and a coil 16b, which is wound around the outside perimeter of the magnetic core member 16a and runs along the inner face of the ring-shaped frame 12a so as to enclose the drive section 13. The magnetic core member 16a preferably comprises a ring-shaped member of multilayered material, such as ferrite or amorphous foil; alternatively, it may comprise a ring-shaped member of a compound material comprising a magnetic metal, ferrite powder, or flakes, and plastic. A highly workable plastic with good thermoplasticity is used as the plastic in the compound material; a heat-resistant thermohardening plastic and the like can be used instead. The metal powder of the compound material comprises carbonyl iron powder, atomized powder such as iron parmalloy, reduced iron powder, and the like. The metal flakes are made by microworking the powder by using a ball-mill, or the like, and mechanically compressing the powder, or by colliding molten granules of an iron-type or cobalt-type amorphous alloy with water-cooled copper.

The magnetic core member 16a of this embodiment is manufactured by injection-molding or compression-molding of a compound material into a bobbin-like shape having a winding frame 16c for the coil 16b. The coil 16b is wound around the perimeter of the magnetic core member 16a, so as to run along the inner face of the ring-shaped frame 12a and enclose the drive section 13, the axis line of the antenna 16 having the coil 16b being perpendicular to the watchface 14a. The IC chip 17 is provided in the cavity 16f of the magnetic core member 16a, and both ends of the coil 16b are electrically connected to the IC chip 17. Thus the antenna 16 and the IC chip 17 constitute an RFID tag 18, which is accommodated in the watch case 12 by inserting it from the bottom lid, 12a side into the ring-shaped frame 12a, so that the supporting axis 13b fits into the cavity 16g of the magnetic core member 16a.

In the second embodiment, data is transmitted and received by a circuit having the same constitution as that shown in FIG. 5 of the first embodiment described above.

Figure 10:
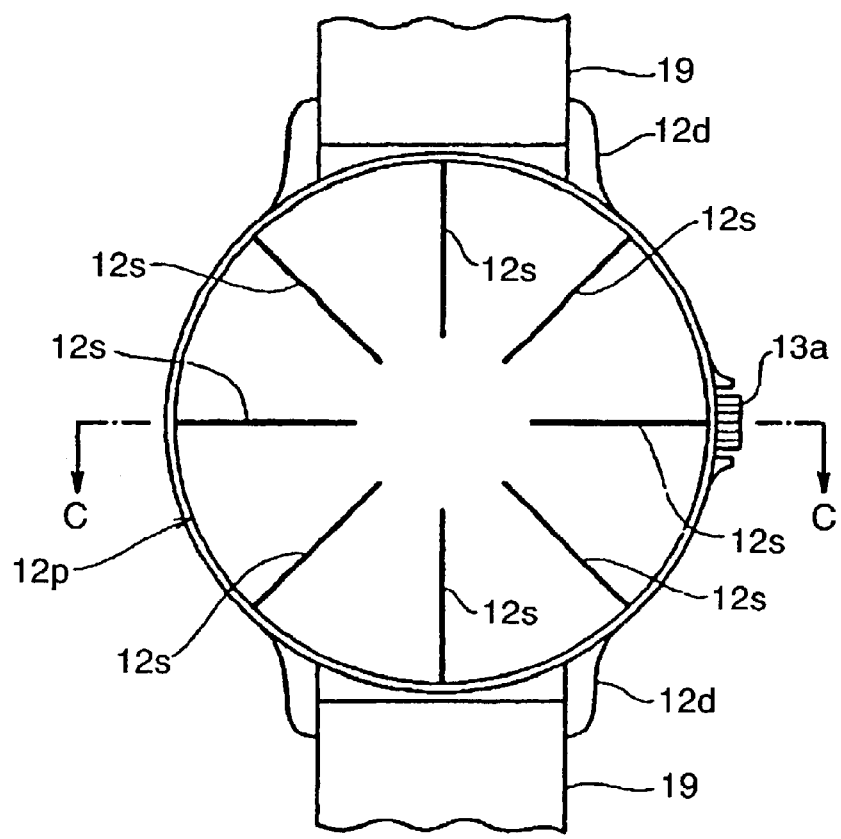
FIG. 10 is a bottom view of the wrist watch containing tag of FIG. 9.

As shown in FIG. 9, the bottom lid 12p comprises a disk-shaped metal lid main lid 12p, and will hereinafter be referred to as such. The bottom side of the ring-shaped frame 12a can be sealed by screwing together the female screw around the metal main lid 12p with the male screw of the ring-shaped frame 12a. One, two, or more slits are provided in the bottom lid 12p. As shown in FIG. 10, this embodiment describes an example where there are eight slits 12s in a radial formation around the center of the bottom lid 12p. The slits 12s are provided by cutting away sections of the ring-shaped frame 12a by a method such as wire-cutting using a thin whetstone or radiation, cutting a wire with paint granules, and the like. Each slit 12s is filled with a nonconductive resin, which affixes together the cutaway planes on opposite sides of the slit 12s. In FIGS. 10 and 11, reference codes 12d and 12d represent pairs of supports protruding from the ring-shaped frame 1 2a, and both ends of a band 19 are attached to the supports 12d and 12d.

In the second embodiment, the identifying unit 26 which reads the information stored in the IC chip 17 has the same constitution as the circuit shown in FIG. 5 of the first embodiment described above.

A method for using the above wrist watch containing tag will be explained.

Before putting on the wrist watch 11, personal information relating to the person who will wear the wrist watch 11 is input from the input section 28g of the identifying unit 26 and stored in the memory 17f of the IC chip 17. This embodiment takes as an example information relating to train tickets, the contents of the information which is stored in the memory 17f specifically relating to first and last dates of a period during which the person is allowed to board the train, and train sections. After the information has been input, the wrist watch 11 is attached to the wrist of the owner by using the bands 19 and 19. In the wrist watch containing tag 11 of this invention, the ring-shaped frame 12a, which is visible around the glass lid 12b, comprises a metallic material, and the metal main lid 12p is used as a bottom lid; therefore, the wrist watch 11 expresses a sense of luxury. Furthermore, in the wrist watch containing tag 11 of this invention, since the cutaway planes of the slits 12s in the metal main lid 12p are filled with the nonconductive resin, the slits 12s do not cause the strength of the bottom lid 12p to deteriorate, ensuring that the watch case 12 remains durable.

The identifying unit 26 is provided at the boarding gate of the train station, and, when a person who is wearing the wrist watch 11 passes through the gate, he holds the wrist watch 11 near to the transmitting-receiving antenna 27 of the identifying unit 26 at the gate. The identifying unit 26 transmits a query signal, comprising a binary digital signal, at a specific radio wave frequency from the transmitting-receiving antenna 27 toward the antenna 16 of the RFID tag 18. Since the bottom lid of the wrist watch 11 comprises the metal main lid 12p having eight slits 12s radiating from the then, the radio waves transmitted from the transmitting-receiving antenna 27 pass through these slits 12s. Furthermore, since the ends of the slits 12s extend to the outer edge of the bottom lid 12p, inductive current can be stopped from flowing in a ring-shape around the bottom lid 12p when the waves are received, preventing the waves from being cancelled by the inductive current. As a result, the sensitivity of the antenna does not deteriorate, and the bottom lid 12p does not obstruct the radio waves which are to be received by the antenna 16 of the RFID tag 18 accommodated inside the watch case 12. In this way, the radio waves transmitted from the transmitting-receiving antenna 27 pass through the bottom lid 12p to the antenna 16. Since the coil 16b of the antenna 16 is wound along the inner face of the ring-shaped frame 12a so as to surround the drive section 13, the magnetic axis of the antenna 16 becomes perpendicular to the watchface 14c, increasing the sensitivity of the RFID tag 18 and achieving a comparatively long operation distance. In particular, since the antenna 16 of this embodiment comprises the magnetic core member 16a, the receiving sensitivity of the antenna 16 itself is increased, enabling it to effectively receive radio waves transmitted from the transmitting-receiving antenna 27.

When the antenna 16 of the RFID tag 18 receives the waves, electrical power is charged to the capacitor of the power circuit 17a. The power circuit 17a supplies the power to the CPU 17e, activating the IC chip 17, whereby the query signal comprising the original digital signal is reproduced at the demodulator circuit 17d via the radio frequency circuit 17b. Based on the query signal, the CPU 17e transmits information relating to the wrist watch 11, stored in the memory 17f The information is transmitted by modulating a binary data signal in the modulator circuit 17c of the IC chip 17, amplifying it in the radio frequency circuit 17b, and transmitting it from the antenna 16. The transmitting-receiving antenna 27 of the identifying unit 26 receives the transmitted data, the processing section 28 displays the information relating to the person wearing the wrist watch according to the RFID tag 18, and the door at the gate opens, allowing the person wearing the wrist watch 11 to board the train.

A third embodiment of this invention will be explained based on FIGS. 12 and 13. The same reference codes as those in the embodiments already described represent the same parts, and explanation of these parts is not repeated.

Figure 12:
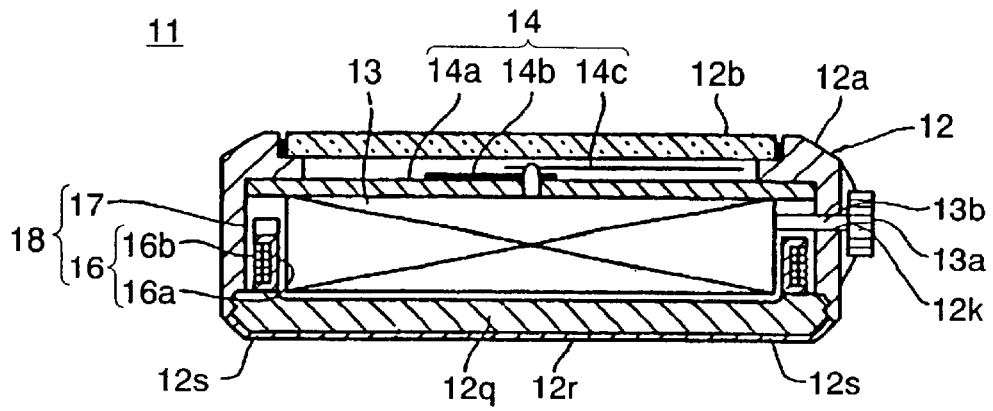
FIG. 12 is a cross-sectional view of a wrist watch containing tag according to a third embodiment of this invention, taken along the line D—D of FIG. 13.

As shown in FIG. 12, the bottom lid 12p comprises a nonmetal main lid 12q which can seal the bottom side of the ring-shaped frame 12a, and a metal supplementary lid 12r which is affixed to the outer face of the nonmetal main lid 12q so as to cover it. The nonmetal main lid 12q is manufactured by injection-molding or compression-molding of an electrical insulating resin, and the metal supplementary lid 12r is manufactured by plate metal processing of a plate material comprising metal. By affixing the metal supplementary lid 12r is affixed to the nonmetal main lid 12q and using metal to make the metal supplementary lid 12r, which constitutes the outer face of the wrist watch 11, the wrist watch 11 is allowed to express a sense of luxury, in addition, one, two, or more, slits are provided in the metal supplementary lid 12r.

Figure 13:
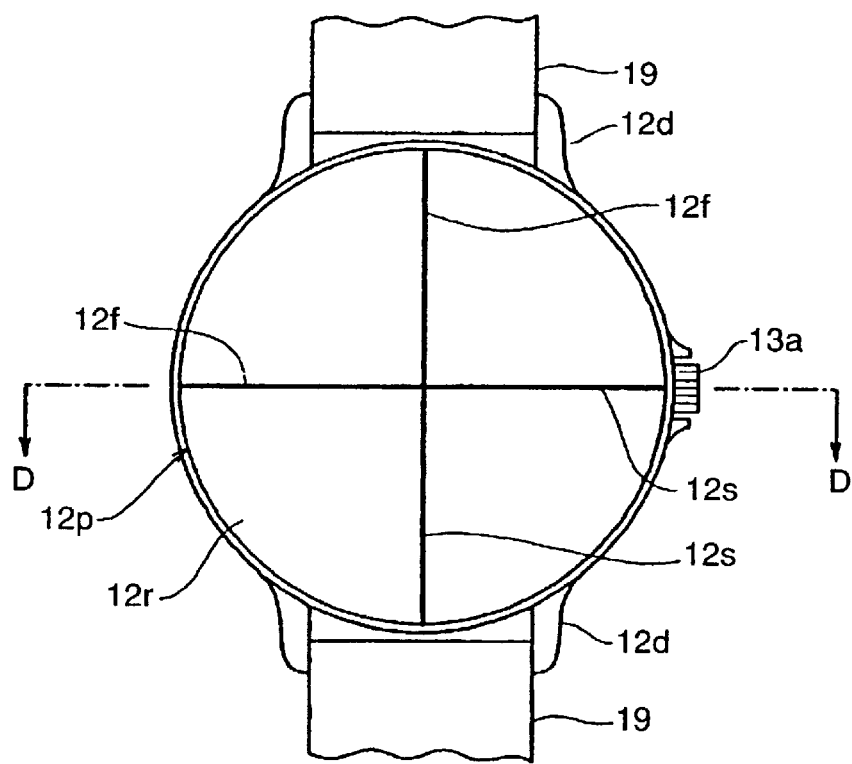
FIG. 13 is a bottom view of the wrist watch containing tag of FIG. 12.

As shown in FIG. 13, this embodiment describes an example where there are two intersecting slits, both ends of the two slits 12s extending to the outer edge of the metal supplementary lid 12r so as to divide the metal supplementary lid 12r into four segments. The slits 12s are formed after affixing the metal supplementary lid 12r to the nonmetal main lid 12q, by cutting away sections of the metal supplementary lid 12r by a method such as wire-cutting using a thin whetstone or radiation, cutting a wire with paint@granules, and the like. The slits 12s is filled with a nonconductive resin, which affixes together the cutaway planes on opposite sides of each slit 12s.

The operation of the wrist watch containing tag will be explained.

Since the ring-shaped frame 12a around the glass lid 12b and the metal supplementary lid 12r, which forms the outer face of the bottom lid, are comprised of metal, the wrist watch containing tag 11 of this embodiment can express a sense of luxury when worn on the wrist. Although the metal supplementary lid 12r which forms the bottom lid of the wrist watch 11 is comprised of metal, the two slits 12s extend to the outer edge of the metal supplementary lid 12r, thereby allowing radio waves transmitted from the transmitting-receiving antenna 27 of the identifying unit 26 to pass through the slits 12s. Since the ends of the two slits 12s extend to the outer edge of the metal supplementary lid 12r, inductive current can be stopped from flowing in a ring-shape around the metal supplementary lid 12r when the waves are received, preventing the waves from being cancelled by the inductive current. As a result, the sensitivity of the antenna does not deteriorate, and the bottom lid having the metal supplementary lid 12r does not obstruct the radio waves which are to be received by the antenna 16 of the RFID tag 18, accommodated inside the watch case 12.

Figure 14:
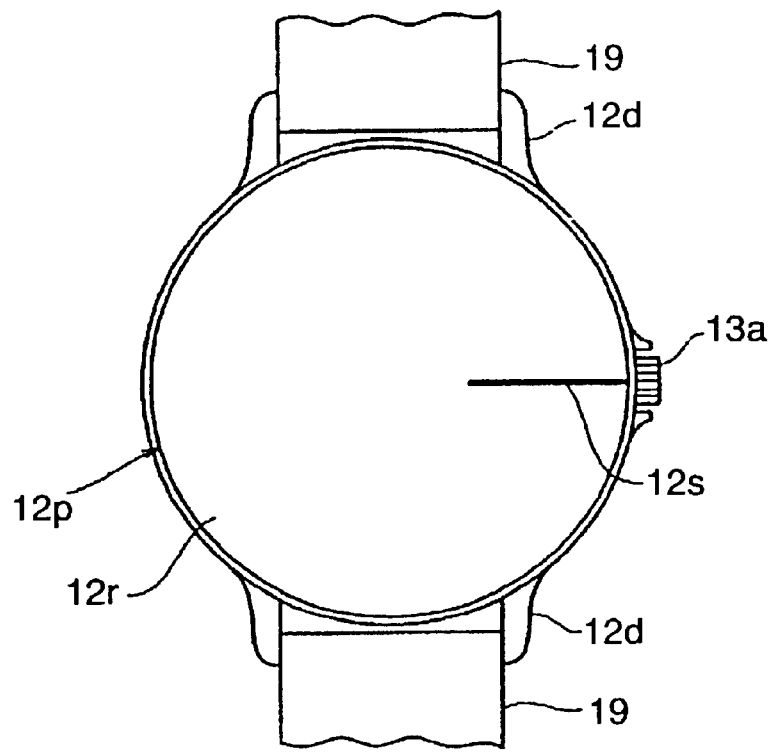
FIG. 14 is a bottom view of a wrist watch having a single slit.
Figure 15:
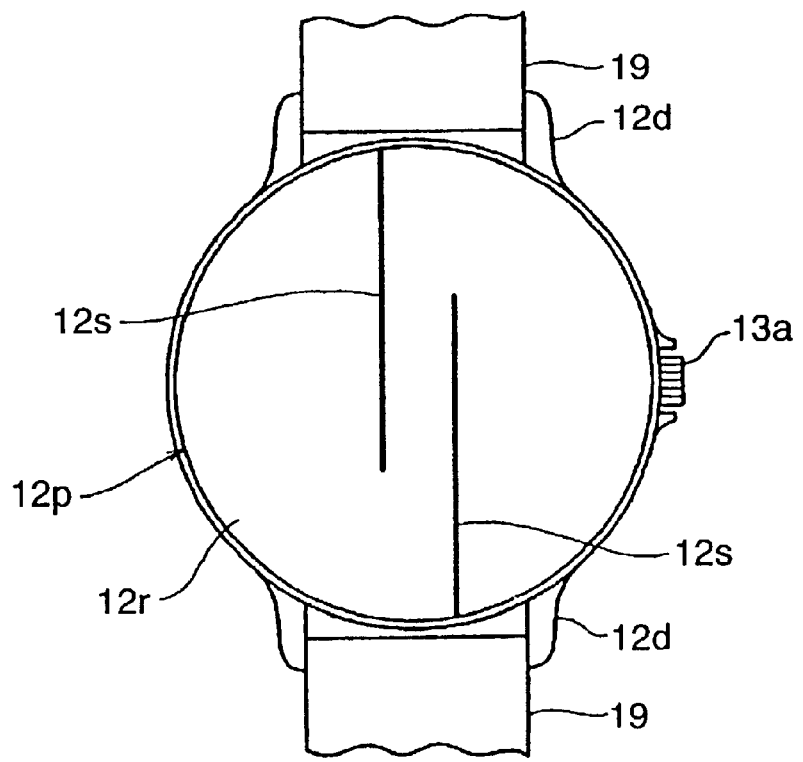
FIG. 15 is a bottom view of a wrist watch wherein two slits are provided in parallel.
Figure 16:
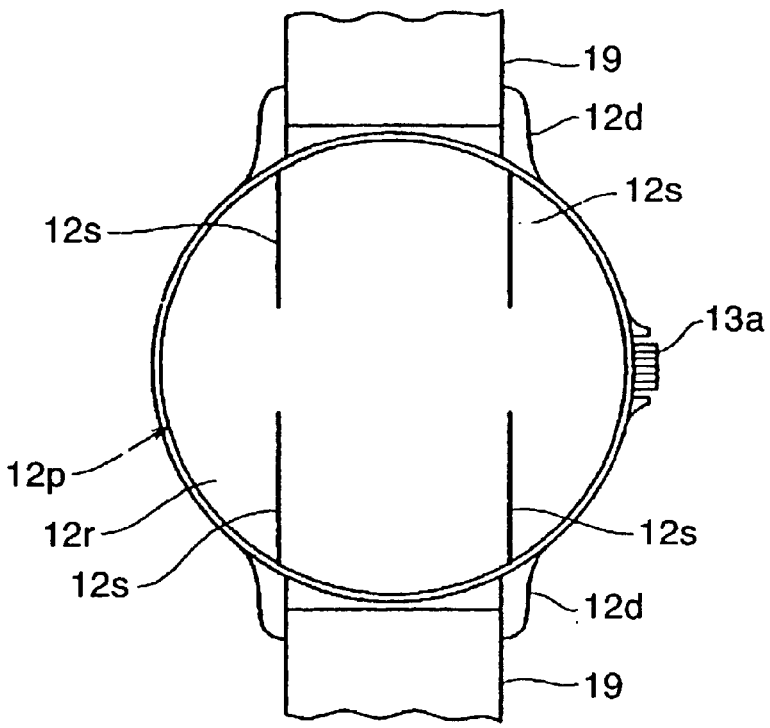
FIG. 16 is a bottom view of a wrist watch wherein four slits are provided in parallel.
Figure 17:
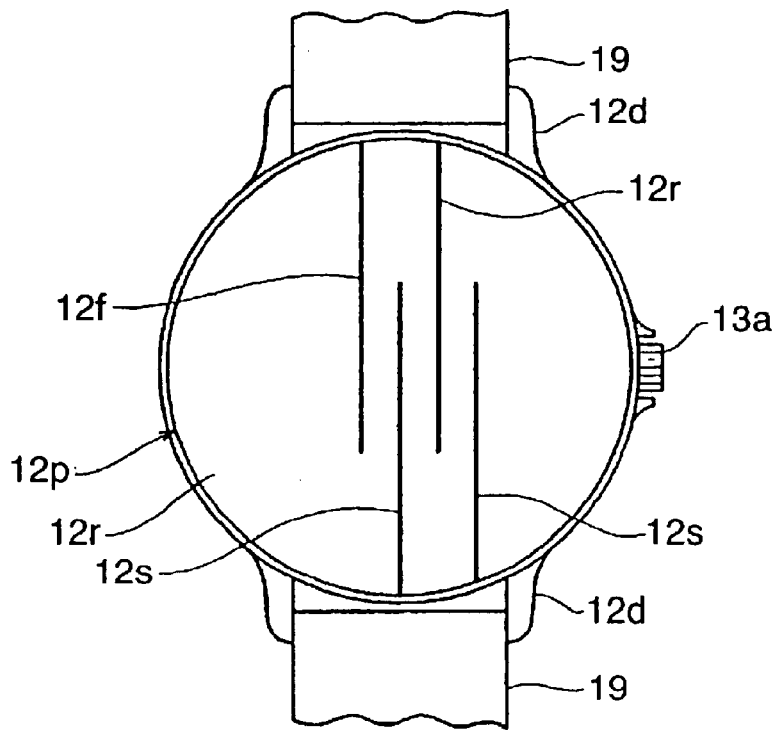
FIG. 17 is a bottom view of another wrist watch wherein four slits are provided in parallel.

The second embodiment describes an example where eight slits 12s radiate from the center of the bottom lid 12p, and the third embodiment describes an example where two slits 12s intersect each other so as to divide the metal supplementary lid 12r into four segments; however, the bottom lid 12p and the metal supplementary lid 12r may be divided into two segments by a single slit, or alternatively, as shown in FIG. 14, a single slit may be provided so as to extend to the outer edge of the bottom lid 12p and the nonmetal main lid 12q. Where more than two slits are provided, the number is not restricted to eight slits, it being acceptable to provide two slits as in FIG. 15, four slits as in FIGS. 16 and 17, nor do the slits need to be provided radially as shown in FIGS. 15 to 17, it being essential only that the flow of ring-shaped inductive current at the time of receiving radio waves can be prevented. When two or more slits are provided, the number of slits may be three, five, six, seven, nine, ten, or more, though such examples are not illustrated in the diagrams.

Figure 18:
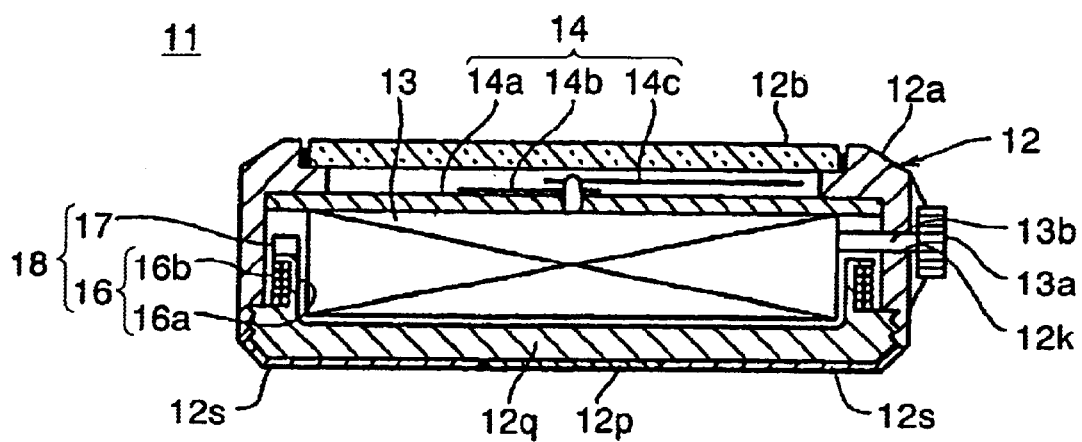
FIG. 18 is a cross-sectional view corresponding to FIG. 9, and shows a modification of a wrist watch wherein the magnetic core member and a nonmetallic main lid are formed in a single piece.
Figure 19:
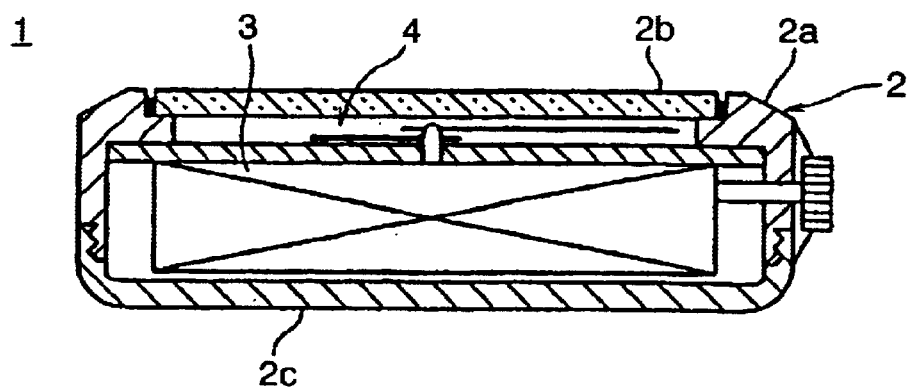
FIG. 19 is a cross-sectional view of a conventional wrist watch.

The third embodiment describes an antenna having a coil 16b which is wound around the outer periphery of the magnetic core member 16a, provided separately from the nonmetal main lid 12q; however, as shown in FIG. 18, when the magnetic core member 16a is made by injection-molding or compression-molding of a compound material, the magnetic core member 16a and the nonmetal main lid 12q should preferably be made together in one piece by injection-molding or compression-molding. When the magnetic core member 16a and the nonmetal main lid 12q are molded together, the manufacturing process becomes simpler than when they are made separately, reducing burden of maintaining the magnetic core member 16a and the nonmetal main lid 12q, and achieving a comparatively inexpensive wrist watch containing tag.

Further, the above embodiments describe the magnetic core member 16a which is manufactured by injection-molding or compression-molding of a compound material; however, when there is a comparatively small gap between the inner face of the ring-shaped frame 12a and the outer face of the drive section 13, the magnetic core member 16a may be made by winding a magnetic painted film into a ring-shape. The magnetic painted film is provided by pasting and drying a magnetic paint, or an ink of magnetic powder or flakes, on an electrical insulating film; the magnetic painted film can be wound together with the electrically insulated film used at the time of painting, or alternatively, the magnetic painted film is peeled off from the electrical insulating film and wound by itself. The same material as the compound material mentioned above can be used as the flakes and powder of the magnetic material contained in the paint and ink. The thickness of the magnetic painted film should be between 10 and 800 $\mu$m, and preferably between 30 and 300 $\mu$m. When the desired thickness cannot be achieved by a single application of paint, the paint can be repeatedly applied and dried until the desired thickness is achieved, and the thickness of the wound section of the magnetic painted film can be adjusted by increasing or decreasing the number of winds. The magnetic core member obtained by winding the magnetic painted film is extremely thin, making it possible to obtain a magnetic core member having a thickness of less than 0.8 mm, at which molding becomes difficult. Therefore, even when there is only a small gap between the inner face of the ring-shaped frame 12a and the outer peripheral face of the drive section 13, it is possible to accommodate an RFID tag having a magnetic core member in the gap.

Subsequently, a test of this invention and a comparative example will be explained in detail.

Comparative Example 1

A wrist watch case 12 comprising a ring-shaped frame 12a of stainless steel having an outer diameter of 32 mm and an inner diameter of 26 mm, the ring-shaped frame 12a having a notch in one section and a thickness of 6 mm; and a metal main lid 12p for sealing the bottom side of the ring-shaped frame 12a, the metal main lid 12p comprising stainless steel and having a diameter of 30 mm and a thickness of 1 mm, was prepared.

A magnetic painted film was obtained by applying and drying a paint containing powder or flakes of a magnetic material over an electrical insulating film, and the magnetic painted film was cut to a width of 4 mm together with the electrical insulating film used at the time of applying the paint, obtaining a strip-like magnetic painted film. The magnetic painted film was wound until it had an outer diameter of 25 mm and an inner diameter of 23 mm, obtaining a magnetic core member. A copper-coated wire having a thickness of 0.14 mm was wound four times around the magnetic core member to achieve an antenna comprising a magnetic core member and a coil. The antenna was accommodated inside the watch case, thereby obtaining a wrist watch containing tag.

This wrist watch is the first comparative example.

Test 1

The watch case 12, and the antenna comprising the magnetic core member and the coil, were prepared in exactly the same way as in the first comparative example. Then, eight slits 12s radiating from the center of the metal main lid were provided by cutting slits having a length of 10 mm from the outer rim of the metal main lid toward its center. The antenna was accommodated inside the watch case, obtaining a wrist watch containing tag. This wrist watch using the bottom lid having slits is the first test.

Comparative Test

A measuring terminal of a gauge (Hewlett Packard 4395) for measuring the coil characteristics was connected to each of the antenna coils of the first comparative example and the first and second tests, and the L values and Q values of the antenna at predetermined frequencies were measured by using the gauge.

An IC chip was connected to each of the antenna coils of the first comparative example and the first and second tests, and made to function as an RFID tag operating at 13.56 MHz; thereafter, the tag was accommodated inside a battery case. The wrist watch containing tag was moved near to a transmitting-receiving antenna of an identifying unit operating at 13.56 MHz, it was confirmed whether the identifying unit was operating, and, when it operated, the distance between the transmitting-receiving antenna and the wrist watch containing tag at the first operation was measured. Table 2 shows the results obtained.

TABLE 2

|  | Test 1 | Comparative example |
|---|---|---|
| L($\mu$H) | 0.815 | 1.061 |
| Q | 18.1 | 21.4 |
| Operation | Operated when the watch was at a position of 10 mm from the transmitting-receiving antenna | No operation even when the watch was placed directly against the transmitting-receiving antenna |

As is clear from Table 2, there is no noticeable difference in the Q values of the first test and the first comparative example. However, the identifying unit did not operate when IC chip was connected to the coil of the antenna in the first comparative example, but did operate when the IC chip was connected to the coil of the antenna in the first test. It may be assumed that the identifying unit did not operate in the first comparative example because no slits are provided in the metal main lid, and consequently an inductive current flows into the metal main lid, reducing the sensitivity of the antenna. In contrast, the identifying unit did operate in the first test due to the provision of slits in the metal main lid, preventing any flow of inductive current and preserving the sensitivity of the antenna.

As described above, according to this invention, since the metal main lid and metal supplementary lid around the outer section of the bottom lid of the watch case comprise a metal material, the original sense of luxury of the wrist watch can be expressed. In addition, since one, two, or more, slits are provided in at least one end of the metal main lid and metal supplementary lid, the metal main lid and metal supplementary lid do not obstruct radio waves which are to be received by the antenna accommodated in the watch case. Further, since the coil of the antenna is wound along the inner face of the ring-shaped frame so as to surround the drive section, the magnetic axis of the antenna is perpendicular to the watchface, increasing the sensitivity of the RFID tag and achieving a comparatively long operating distance. By filling the slits with nonconductive resin, the slits do not reduce the strength of the bottom lid.

Further, since the ring-shaped magnetic core member of the antenna is provided along the inner face of the ring-shaped frame so as to surround the drive section, and the coil is wound around the outer periphery of the magnetic core member, the reception sensitivity of the antenna can be increased. In this case, when the magnetic core member comprises a compound material, it can be made into any given shape; by making the magnetic core member a bobbin-like shape, it is easier to wind the coil. Further, by molding the magnetic core member and the nonmetal main lid together in one piece, the manufacturing process is simplified, and the wrist watch containing tag be obtained comparatively inexpensively. On the other hand, by making the magnetic core member by winding a magnetic painted film into a ring-shape, it becomes possible to obtain a magnetic core member having a thickness of less than 0.8 mm, at which molding becomes difficult; even when there is only a small gap between the inner face of the ring-shaped frame and the outer peripheral face of the drive section, the RFID tag having the magnetic core member can be accommodated in the gap.

What is claimed is:

1. A wrist watch containing tag comprising:
   a watch case having a ring-shaped frame, a glass lid which seals a top side of the ring-shaped frame, and a bottom lid which seals a bottom side of the ring-shaped frame;
   a drive section which is accommodated inside said watch case;
   a display section for displaying time which is accommodated inside the watch case and is driven by said drive section; and
   an RFID tag which is accommodated inside the watch case and comprises an antenna and an IC chip; wherein,
   the antenna comprising a wound coil which runs along the inner face of said ring-shaped frame so as to surround said drive section;
   at least one of said ring-shaped frame and said bottom lid comprising a metal material, and in addition, a slit for preventing the generation of inductive current being provided in at least one of said ring-shaped frame and said bottom lid which comprise(s) the metal material.

2. The wrist watch containing tag as described in claim 1, said ring-shaped frame comprising a metal material, said bottom lid comprising an electrical insulating material, and said ring-shaped frame having a slit made by cutting at least one section of said ring-shaped frame.

3. The wrist watch containing tag as described in claim 2, said slit being filled with a nonconductive resin, affixing together opposing cutaway planes which form said slit.

4. The wrist watch containing tag as described in claim 3, the opposing cutaway planes which form said slit comprising a plurality of continuous cutaway planes.

5. The wrist watch-containing tag as described in claim 2, an indent being provided in the top side and/or the bottom side of said ring-shaped frame, said slit being provided across said indent, and a clip member comprising the same material as said ring-shaped frame being affixed in said indent with the nonconductive resin therebetween.

6. The wrist watch containing tag as described in claim 5, said antenna comprising a magnetic core member along the inner face of said ring-shaped frame so as to surround said drive section, said coil being wound around an outer periphery of said magnetic core member.

7. The wrist watch containing tag as described in claim 6, said magnetic core member comprising a bobbin-like shape having a winding frame for coil, and being comprised of a compound material of magnetic powder or flakes and plastic.

8. The wrist watch containing tag as described in claim 7, said magnetic core member being formed by injection-molding or compression-molding of a compound material.

9. The wrist watch containing tag as described in claim 6, said magnetic core member being formed by winding a magnetic painted film, made by applying and drying a paint or ink comprising powder or flakes of a magnetic material.

10. The wrist watch containing tag as described in claim 1, said bottom lid comprising a metal main lid, or a nonmetal main lid and a metal supplementary lid, which is affixed so as to cover said nonmetal main lid;

one, two, or more, slits being provided in at least one end of said metal main lid and said metal supplementary lid and extending to the outer edge thereof.

11. The wrist watch containing tag as described in claim 10, said slit(s) being filled with a nonconductive resin, affixing together opposing cutaway planes which form said slit(s).

12. The wrist watch containing tag as described in claim 10, the opposing cutaway planes which form said slit(s) comprising a plurality of continuous cutaway planes.

13. The wrist watch containing tag as described in claim 12, said antenna comprising a magnetic core member along the inner face of said ring-shaped frame so as to surround said drive section, said coil being wound around an outer periphery of said magnetic core member.

14. The wrist watch containing tag as described in claim 13, said magnetic core member being formed by winding a magnetic painted film, made by applying and drying a paint or ink comprising powder or flakes of a magnetic material, into a ring-shape.

15. The wrist watch containing tag as described in claim 12, said magnetic core member comprising a bobbin-like shape having a winding frame for coil, and being comprised of a compound material of magnetic powder or flakes and plastic.

16. The wrist watch containing tag as described in claim 15, said magnetic core member being formed by injection-molding or compression-molding of a compound material.

17. The wrist watch containing tag as described in claim 16, said magnetic core member and said nonmagnetic main lid being formed together in one piece by injection-molding or compression-molding of a compound material.

\* \* \* \* \*